United States Patent Office 3,274,872
Patented Sept. 27, 1966

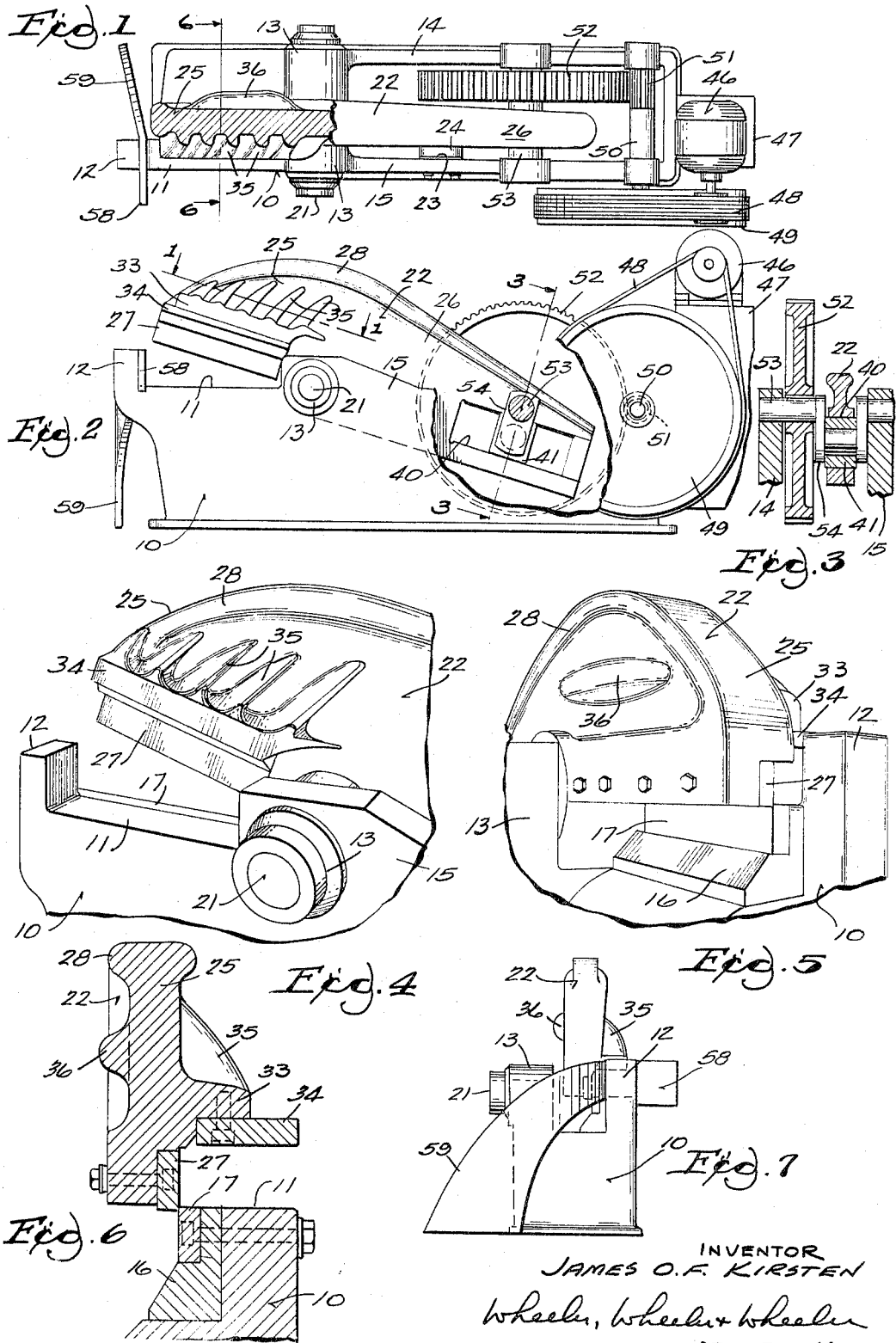

3,274,872
METAL SHEARS
James O. F. Kirsten, Box 86, Lannon, Wis.
Filed Jan. 12, 1965, Ser. No. 425,017
9 Claims. (Cl. 73—339)

This invention relates to improvements in metal-cutting shears and particularly in shears intended for heavy duty work such as the shearing of metal plates, stacks of sheets, structural steel, heavy scrap metal and like workpieces.

In the present shear, both the stationary portion or base and the movable portion or jaw are made exceptionally heavy and rugged and the jaw is especially reinforced where the greatest stresses are to be expected. The shear table extends from one side of the base toward the centerline of the shear and the blades providing the cooperating shearing edges act substantially centrally of the machine for greater rigidity and better balance of stresses on the parts during cutting. The base is formed with an especially wide table surface to one side of the cutting edges, on which the metal being sheared is held under compression. The jaw is provided with a plate for coaction with the base table for pressing such workpieces as masses of metal scrap and the like on the table. The forward end of the base table is formed with a holding block extending upward from the table toward the shear jaw for preventing workpieces from sliding between the shear blades during the cutting stroke. Plates extend from both sides of the holding block to guard against the throwing or thrusting of pieces of metal from a mass of metal being sheared, and especially during the shearing of mixed metal scrap. The drive for the jaw includes only the driving motor, a pulley flywheel driving a pinion gear and a driven gear delivering power to a block sliding in the jaw. The drive is therefore much simplified and develops increased leverage for greater power on the cutting stroke than heretofore with a given size of motor.

In the drawings:

FIG. 1 is a top plan view of the present shear with a portion of the jaw cut along the line 1—1 of FIG. 2.

FIG. 2 is a side elevation of the present shear with a portion of the base broken away to illustrate a part of the drive.

FIG. 3 is a partial cross section of the machine taken on the plane of line 3—3.

FIG. 4 is a perspective view showing the jaw raised and illustrating the base table and holding block, the shear blades and the pressure plate on the jaw.

FIG. 5 is a perspective view showing the shear with the jaw closed and from the side thereof opposite that shown in FIG. 4.

FIG. 6 is a cross section on the line 6—6 of FIG. 1, and

FIG. 7 is a front elevation of the shear showing guard plates mounted on the table block, especially for use in cutting mixed scrap.

Referring specifically to the structure illustrated, a base generally designated 10 provides a table with a solid surface portion 11 and with a block 12 formed at the forward end of such table to keep workpieces from sliding from below the jaw when the jaw is being closed. The base 10 provides heavy bearings 13 and is divided back of the bearings to provide side walls 14 and 15 between which are mounted the movable jaw and most of the drive. A bar 16 seats in a recess along an edge of the base for the adjustable mounting thereon of a blade 17 providing one of the shear edges. The table 11 extends from one side only of the shear blade 17.

The base bearings 13 receive a heavy axle 21 for a jaw generally designated 22. Side wall 15 is formed with a well finished surface 23 on which a pad 24 on the jaw 22 slides to transmit to the side wall some of the side thrust acting on the jaw as the shearing takes place. The jaw has a forward portion 26 adjacent the center line between the base walls 14 and 15, and the jaw portion 25 has a recess to receive a replaceable blade 27 providing a second edge for shearing coaction with an edge of the blade 17. The jaw 22–26 has a flanged upper rim 28 extending from near the forward end of jaw blade 27 and along substantially the entire upper edge of the jaw for generally reinforcing the jaw. Such reinforcement is however not adequate for the exceptionally heavy duty imposed on some of the shears illustrated, so that a ledge 33 is built out from the jaw forward portion 25 to provide a seat for a pressure plate 34 which is substantially coextensive with the upper surface of base table 11 whereby bundles of scrap metal and the like may be held under pressure against movement during the shearing stroke or for collapsing bulky material such as pipe, drums and the like. The ledge 33 is backed and reinforced by ribs 35 extending toward the rim 28 but merging into the body of the jaw part 25 on the side opposite ledge 33, to extend substantially parallel with the blade 27 and from inside the rim 28 to adjacent the jaw axle 21. The boss 36 is approximately centered between the pressure surface of the blade 34 and the rim 28 of the jaw and is oval-shaped and rounded and merges in the general mass of the jaw. The boss 36 provides balanced reinforcement of the jaw opposite ledge 33 and plate 34, and for the first time makes the jaw equal in durability to other parts of the shear subject to overloading.

The rearward portion 26 of the jaw has a slot 40 in which is slidably mounted a block 41 for connection with the drive for the jaw. Such drive comprises an electric motor 46 or the like mounted on or in a rearward portion 47 of the base. The motor drives by way of belts 48 to a pulley flywheel 49 mounted on a shaft 50 supported in the base walls 14, 15. The shaft 50 has formed therein or mounted thereon a pinion gear 51 engaging with a large gear 52 on a shaft 53 formed with a crank 54, on which the block 41 is mounted. For each rotation of the gear 52 and the shaft 53 fixed thereto, the block 41 slides in the jaw slot 40 to produce oscillation of the jaw on its axle 21 for coaction of its blade 27 with the adjustable base blade 17, in shearing metal. As shown in FIG. 2, when the block 41 is approximately midway in the slot 40 the jaw is swung to lift the forward end 25 thereof. Upon further rotation of shart 53, the block 41 slides to the rearward end of the slot 40 and the jaw is swung downward to shear the workpieces between the blades 17 and 27. The leverage swinging the jaw about its axle 21 for the shearing stroke is substantially longer than the leverage acting on the jaw on the lifting stroke so that the shear operates wtih increased power without reducing the ruggedness of the drive.

When the shear is to be used for cutting mixed scrap, the scrap is fed in a loose mass from the side of FIG. 7 (shears are made for left hand feed also). In shearing such mixed scrap and if the pressure plate 34 is not fully effective to hold all the pieces under pressure, there is danger that the shear will pull or push a piece of scrap out of the mass and throw or thrust it forward of the shear, even though the mass itself exerts some restraint on loose ends of scrap due to their engagement with the balance of the scrap. Hence, a guard plate 58 of a length to extend laterally from the edge of the block 12 for a distance up to several feet and of a width to extend slightly above the mass of scrap and down to the level of the feed conveyor, is mounted (see FIGS. 1, 2 and 7) to the inside surface of block 12 and serves to guard against the throwing or thrusting of scrap ends from the mass of scrap being fed.

A similar throwing or thrusting action may take place on the lefthand side (FIG. 2) of the shear, where the cutoff portion of the mass falls from the shear table. However, such cutoff portions are not under the restraint of a mass of mixed scrap so that the pieces cut off may be thrown or thrust free at various positions. Hence a second guard plate 59 is likewise mounted to the inside of block 12 and extends laterally leftward and downward from the block to at least close to the base surface of the shear. The plate 59 must accordingly to substantially larger than the plate 58 to perform its guarding function to the same degree as is done by plate 58.

It will be noted that the top of the holding block 12 is substantially at the level of the pressure surface of plate 34 when the shearing action takes place. Obviously, the forward end of pressure plate 34 is approaching the upper end of the block 12 from the time the shearing stroke commences so that only a small area remains open for the sliding forward, for example, of the upper parts of a bundle of scrap metal, under the thrust of the start of the shearing. Even though the greater mass of the ledge 33 is a considerable distance below the boss 36 and such boss does not merge with the reinforced rim 28 of the jaw, it has been found that ledge and boss coact to resist the shearing pressure and shocks which previously caused heavy duty shear jaws to fail (crack) if the shear was overloaded.

I claim:

1. In a power-driven shear for cutting metal workpieces, a base having a forward portion providing a table for supporting the workpieces during shearing, a shear blade mounted along an edge of the base forward portion and substantially coextensive with the length of the table, the base having a holding block at the forward end of the table and extending above the table for limiting forward moving of workpieces during shearing and relative to the table, a jaw pivoted on the base adjacent the rearward end of the table and having portions extending forward and rearward from the pivot point, a shear blade mounted on an edge of the forward portion of the jaw for coaction with the base shear blade, the base table being wider than the general thickness of the jaw and extending laterally toward one side from the coacting edges of the shear blades, and a power drive mounted on the base and comprising a source of power and speed reducing gearing driven by the power source and means connecting the gearing with the jaw for oscillating the jaw to secure shearing coaction of the blades.

2. The power-driven metal cutting shear of claim 1 in which the holding block is substantially the width of the table and of a thickness in a direction parallel to the top of the base table for providing tensile strength equal to the maximum pressure of the jaw upon shearing of workpieces.

3. The metal cutting power-driven shear of claim 1 in which a plate is mounted on the forward portion of the jaw to extend over and be substantially coextensive with the base table, the plate moving to a position compressing the workpieces during the cutting portion of the shearing stroke.

4. The metal cutting power-driven shear of claim 3 in which a surface of the plate moves toward parallel position with and is above the base table top and below the top of the holding block as to press on the workpieces during the shearing stroke.

5. The power driven metal cutting shear of claim 3 in which the jaw has a flanged rim along a side thereof and a reinforced ledge extends from another side of the forward jaw portion for seating the plate thereon and a boss extends from the other side of the jaw forward portion approximately midway between the bottom of the ledge and the upper edge of the forward jaw portion at the widest forward portion thereof, the boss being shorter than the ledge and fairing into the jaw short of the flanged rim thereof.

6. In a power-driven shear for cutting metal workpieces, a base having a forward portion providing a table for supporting the workpieces during shearing, the forward end of the table being defined by a holding block extending above the table and a rearward base portion being defined by two spaced walls, a shear blade mounted along an edge of the forward base portion and for substantially the length of the table, a jaw pivoted adjacent the rearward end of the table and having portions extending forward and rearwardly from the pivot point, the rearward jaw portion extending between the rearward spaced base walls, a shear blade mounted in an edge of a forward portion of the jaw for co-action with the base shear blade, and a power drive mounted on the base and comprising a source of power driving a pulley flywheel for driving speed reducing gearing and means connecting the gearing with the jaw, the pulley flywheel and the gearing and the connecting means all being mounted between the rearward walls of the base for guarding the drive against contact of persons and materials therewith.

7. The metal cutting power-driven shear of claim 6 in which the rearward portion of the jaw has a slot therein and a shaft of the gearing extends adjacent to and transversely the jaw and has a crank formed therein, and the connecting means comprises a block slidable in the slot and rotatably mounted on the gearing shaft crank.

8. The metal cutting power driven shear of claim 6 in which a guard plate is mounted on the holding block and extends laterally beyond the sides of the base for limiting movement of workpieces away from the shear.

9. The metal cutting power driven shear of claim 6 in which a guard plate is mounted on the holding block and extends laterally beyond the sides of the base, the guard plate being of a width substantially-co-extensive with the height of the holding block above the base table on one side of the base and extending substantially to the bottom surface of the base on the other side thereof for limiting movement of sheared workpiece portions away from the shear.

References Cited by the Examiner

UNITED STATES PATENTS

| 3,039,344 | 6/1962 | Hercik | 83—602 X |
| 3,073,200 | 1/1963 | Hercik | 83—602 |

FOREIGN PATENTS 1,044,384  11/1953  France.

WILLIAM S. LAWSON, *Primary Examiner.*